United States Patent
Homma et al.

(10) Patent No.: US 11,644,328 B2
(45) Date of Patent: May 9, 2023

(54) SAFETY DRIVE ASSIST APPARATUS

(71) Applicant: SUBARU CORPORATION, Tokyo (JP)

(72) Inventors: Takuya Homma, Tokyo (JP); Tsukasa Mikuni, Tokyo (JP); Toru Kato, Tokyo (JP); Ryota Nakamura, Tokyo (JP); Masatoshi Tsuge, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/547,827

(22) Filed: Dec. 10, 2021

(65) Prior Publication Data
US 2022/0196423 A1 Jun. 23, 2022

(30) Foreign Application Priority Data

Dec. 22, 2020 (JP) .............................. JP2020-212601
Oct. 29, 2021 (JP) .............................. JP2021-178209

(51) Int. Cl.
G06V 40/10 (2022.01)
G06V 20/59 (2022.01)
G06V 40/18 (2022.01)
G01C 21/34 (2006.01)

(52) U.S. Cl.
CPC ....... *G01C 21/3484* (2013.01); *G06V 20/597* (2022.01); *G06V 40/10* (2022.01)

(58) Field of Classification Search
None
See application file for complete search history.

(56) References Cited

U.S. PATENT DOCUMENTS

2022/0009524 A1* 1/2022 Oba .................. B60W 60/0061
2022/0011132 A1* 1/2022 Jia ........................... B60Q 9/008

FOREIGN PATENT DOCUMENTS

JP 2020-082906 A 6/2020

* cited by examiner

*Primary Examiner* — Samuel D Fereja
(74) *Attorney, Agent, or Firm* — McDermott Will & Emery LLP

(57) ABSTRACT

A safety drive assist apparatus includes an imaging unit, an information acquisition unit, first and second determination processors, and a search control processor. The imaging unit captures an image of an occupant inside a vehicle. The information acquisition unit is provided inside and outside the vehicle and acquires information including biometric information of the occupant. The first and the second determination processors determine physical and mental fatigue levels of the occupant inside the vehicle, respectively, on the basis of the image captured by the imaging unit or the information acquired by the information acquisition unit. The search control processor searches for a recommended traveling route and a recommended stop-by point on the basis of a search condition, and propose a result of the search to the occupant. The search condition is based on one or both of determination information obtained by the first determination processor, the second determination processor.

9 Claims, 12 Drawing Sheets

| INFORMATION ACQUIRED FROM IMAGING UNIT 10 AND INFORMATION ACQUISITION UNIT 20 | PHYSICAL FATIGUE | MENTAL FATIGUE |
|---|---|---|
| HEART RATE | | ○ |
| BLOOD-OXYGEN SATURATION | ○ | |
| HEART RATE VARIABILITY | | ○ |
| RESPIRATORY RATE | ○ | ○ |
| BODY TEMPERATURE | ○ | ○ |
| BLOOD PRESSURE | ○ | ○ |
| HEMOGLOBIN LEVEL | ○ | ○ |
| ACTIVITY AMOUNT | ○ | |
| NUMBER OF TIMES OF BLINKING | ○ | ○ |
| OPENING DEGREE OF EYE | ○ | ○ |
| SLEEP DURATION | ○ | |
| NUMBER OF TIMES OF ROLLING WHILE SLEEPING | ○ | |
| SLEEP STATE | ○ | |
| REST DURATION | ○ | |
| VEHICLE EXTERNAL ENVIRONMENT | ○ | ○ |

FIG. 3

| INFORMATION ACQUIRED FROM IMAGING UNIT 10 AND INFORMATION ACQUISITION UNIT 20 | FIRST DETERMINATION PROCESSOR 30 | SECOND DETERMINATION PROCESSOR 40 | THIRD DETERMINATION PROCESSOR 50 |
|---|---|---|---|
| HEART RATE |  | 4 |  |
| BLOOD-OXYGEN SATURATION | 4 |  |  |
| HEART RATE VARIABILITY |  | 3 |  |
| RESPIRATORY RATE | 4 | 3 |  |
| BODY TEMPERATURE | 2 | 2 |  |
| BLOOD PRESSURE | 2 | 2 |  |
| HEMOGLOBIN LEVEL | 4 | 3 |  |
| ACTIVITY AMOUNT | 2 |  | 4 |
| NUMBER OF TIMES OF BLINKING | 1 | 2 | 3 |
| OPENING DEGREE OF EYE | 1 | 4 |  |
| SLEEP DURATION | 3 |  | 4 |
| NUMBER OF TIMES OF ROLLING WHILE SLEEPING | 3 |  | 3 |
| SLEEP STATE | 3 |  | 4 |
| REST DURATION | 3 |  | 3 |
| VEHICLE EXTERNAL ENVIRONMENT | 3 | 3 |  |

FIG. 4

| KIND OF FATIGUE | SEARCH CONDITION |
|---|---|
| PHYSICAL FATIGUE | SEARCH FOR TRAVELING ROUTE BASED ON SEARCH CONDITION FOR REDUCING PHYSICAL FATIGUE<br>  TRAFFIC CONGESTION INFORMATION<br>  ROAD WIDTH<br>  NUMBER OF TRAFFIC LIGHTS<br>  NUMBER OF PEDESTRIANS<br>  TRAFFIC AMOUNT<br>  WEATHER etc.<br><br>SEARCH FOR STOP-BY POINT BASED ON SEARCH CONDITION FOR REDUCING PHYSICAL FATIGUE<br>  REST SPOT CLOSE TO CURRENT LOCATION<br>  REST SPOT WITH GOOD REST FACILITY etc. |
| MENTAL FATIGUE | SEARCH FOR TRAVELING ROUTE BASED ON SEARCH CONDITION FOR REDUCING MENTAL FATIGUE<br>  ROAD WIDTH<br>  ROAD WITH NICE VIEW etc.<br><br>SEARCH FOR STOP-BY POINT BASED ON SEARCH CONDITION FOR REDUCING MENTAL FATIGUE<br>  REST SPOT WITH NICE VIEW<br>  REST SPOT WITH GOOD REST FACILITY etc. |

FIG. 6

SAFETY DRIVE ASSIST APPARATUS

CROSS-REFERENCE TO RELATED APPLICATIONS

The present application claims priority from Japanese Patent Application No. 2020-212601 filed on Dec. 22, 2020, and 2021-178209 filed on Oct. 29, 2021, the entire contents of each which are hereby incorporated by reference.

BACKGROUND

The technology relates to a safety drive assist apparatus.

In general, at a driving start timing of a vehicle, it is difficult to determine physical and mental fatigue, etc. of an occupant, including a driver, inside the vehicle and to also accurately determine a degree of the physical and mental fatigue, etc. of the occupant.

Meanwhile, the following technique is disclosed regarding sleepiness of a driver. That is, a sleepiness level of the driver is detected, and whether awakening assistance for the driver is necessary is determined on the basis of the detected sleepiness level. In a case where the awakening assistance is necessary, a driver's seat is vibrated at least in some time slots with use of a vibration wave in which a first frequency promoting muscle tone and a second frequency suppressing muscle tone are imposed on each other. Such a technique is disclosed, for example, in Japanese Unexamined Patent Application Publication (JP-A) No. 2020-082906.

SUMMARY

An aspect of the technology provides a safety drive assist apparatus to be applied to a vehicle. The safety drive assist apparatus includes an imaging unit, an information acquisition unit, a first determination processor, a second determination processor, and a search control processor. The imaging unit is configured to capture an image of an occupant inside the vehicle. The information acquisition unit is provided inside and outside the vehicle and configured to acquire information including biometric information of the occupant. The first determination processor is configured to determine a physical fatigue level of the occupant inside the vehicle on the basis of the image of the occupant inside the vehicle captured by the imaging unit or the information including the biometric information of the occupant inside and outside the vehicle acquired by the information acquisition unit. The second determination processor is configured to determine a mental fatigue level of the occupant inside the vehicle on the basis of the image of the occupant inside the vehicle captured by the imaging unit or the information including the biometric information of the occupant inside and outside the vehicle acquired by the information acquisition unit. The search control processor is configured to search for a recommended traveling route and a recommended stop-by point on the basis of a search condition, and propose one or both of the recommended traveling route and the recommended stop-by point to the occupant. The search condition is based on one or both of first determination information obtained by the first determination processor upon determining the physical fatigue level and second determination information obtained by the second determination processor upon determining the mental fatigue level.

An aspect of the technology provides a safety drive assist apparatus to be applied to a vehicle. The safety drive assist apparatus includes an imaging unit and circuitry. The imaging unit is configured to capture an image of an occupant inside the vehicle. The circuitry is configured to acquire information including biometric information of the occupant inside and outside the vehicle. The circuitry is configured to determine a physical fatigue level of the occupant inside the vehicle on the basis of the image of the occupant inside the vehicle captured by the imaging unit or the acquired information including the biometric information of the occupant inside and outside the vehicle. The circuitry is configured to determine a mental fatigue level of the occupant inside the vehicle on the basis of the image of the occupant inside the vehicle captured by the imaging unit or the acquired information including the biometric information of the occupant inside and outside the vehicle. The circuitry is configured to search for a recommended traveling route and a recommended stop-by point on the basis of a search condition, and propose one or both of the recommended traveling route, the recommended stop-by point to the occupant. The search condition is based on one or both of first determination information regarding the physical fatigue level and determination information regarding the mental fatigue level.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 3 is a diagram illustrating an example of a relationship between physical or mental fatigue and information of the occupant of the safety drive assist apparatus according to one example embodiment of the technology.

FIG. 4 is a diagram illustrating an example of determination information obtained by a first determination processor, a second determination processor, and a third determination processor of the safety drive assist apparatus according to one example embodiment of the technology.

FIG. 6 is a diagram illustrating an example of a search condition for a traveling route and a stop-by point of the safety drive assist apparatus according to one example embodiment of the technology.

DETAILED DESCRIPTION

Figure 1:
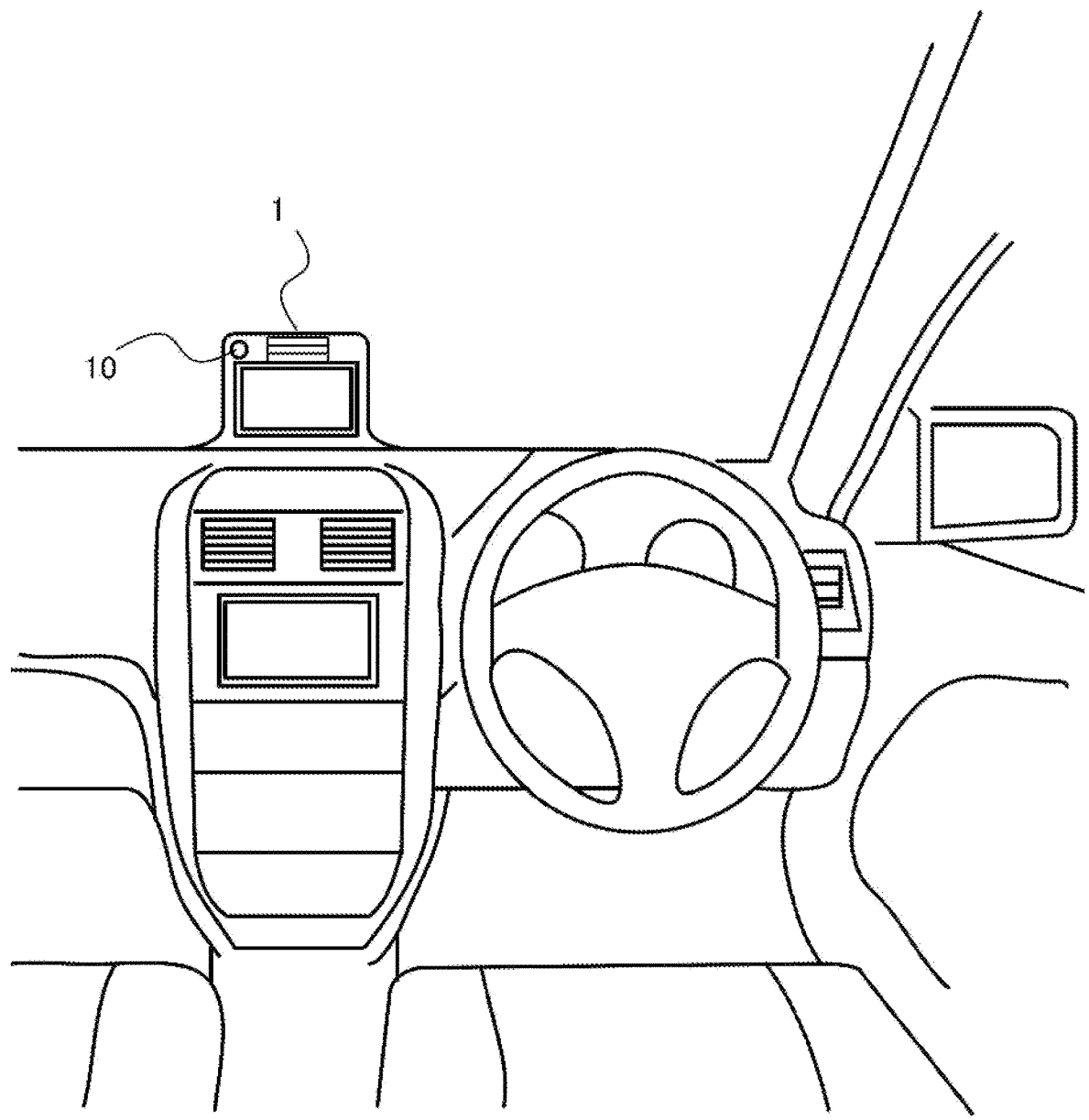
FIG. 1 is a diagram illustrating an example of a disposed state of a safety drive assist apparatus according to one example embodiment of the technology.

In a technique disclosed in JP-A No. 2020-082906, an awakening assistance based on a sleepiness level is performed to reduce a possibility of accident occurrence. However, it is difficult to reduce a possibility of accident occurrence due to physical fatigue or mental fatigue that is indeterminable on the basis of the sleepiness level, which still leaves room for improvement. For example, it is difficult to reduce a possibility of accident occurrence due to a lowered physical capability caused by the physical fatigue and/or the mental fatigue.

It is desirable to provide a safety drive assist apparatus that makes it possible to propose a traveling route, a rest point, or the like in accordance with physical and mental fatigue levels of an occupant and to thereby reduce a possibility of accident occurrence.

In the following, some example embodiments of the technology are described with reference to FIGS. 1 to 12. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

First Example Embodiment

Referring to FIGS. 1 to 8, a safety drive assist apparatus 1 according to a first example embodiment of the technology is described.

Figure 2:
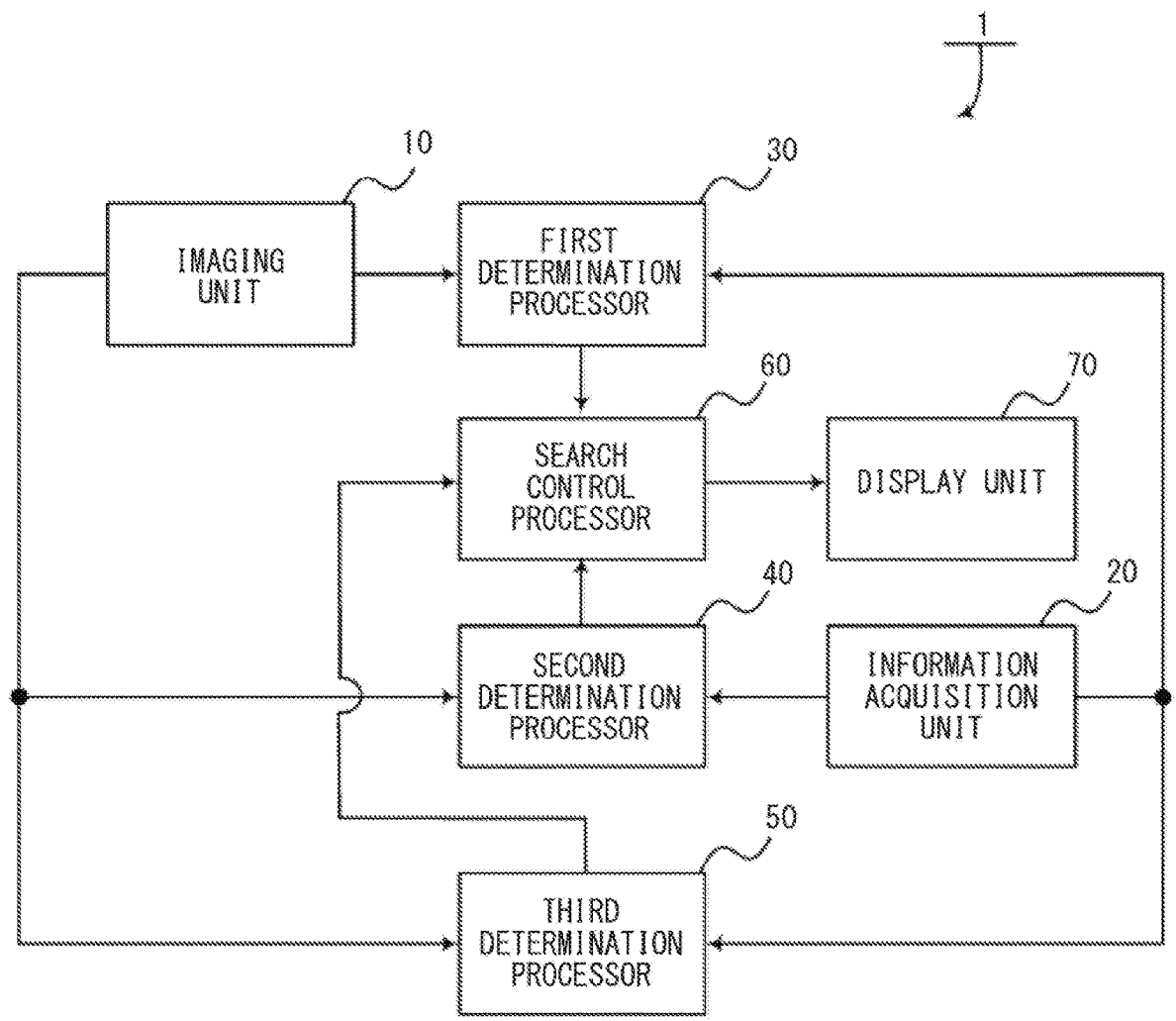
FIG. 2 is a diagram illustrating an example of a configuration of the safety drive assist apparatus according to one example embodiment of the technology.

As illustrated in FIG. 1, the safety drive assist apparatus 1 according to the first example embodiment may be provided, for example, at a middle part in front of a driver's seat inside a vehicle. As illustrated in FIG. 2 which will be described later, in the safety drive assist apparatus 1, a search control processor 60 may search for a recommended traveling route and a recommended stop-by point on the basis of a search condition, on the basis of an image of the occupant captured by an imaging unit 10 or information including biometric information of the occupant inside and outside the vehicle acquired by an information acquisition unit 20, and propose the recommended traveling route, the recommended stop-by point, or both to the occupant. The search condition may be based on determination information obtained by the first determination processor 30, determination information obtained by the second determination processor 40, or both. Details of the configuration will be described later.

[Configuration of Safety Drive Assist Apparatus 1]

As illustrated in FIG. 2, the safety drive assist apparatus 1 according to the first example embodiment may include the imaging unit 10, the information acquisition unit 20, the first determination processor 30, the second determination processor 40, a third determination processor 50, the search control processor 60, and a display unit 70.

The imaging unit 10 may include, for example, a built-in imaging device such as a charge coupled device (CCD) or a complementary metal oxide semiconductor (CMOS) image sensor (CIS). The imaging unit 10 may output an image, including a moving image and a still image, of the occupant inside the vehicle captured by the imaging device.

In one example, the imaging unit 10 may be a camera to be used only as the imaging unit 10. However, for example, in a case where an occupant recognition apparatus is provided, an imaging unit of the occupant recognition apparatus may be used as the imaging unit 10. In one example, the imaging unit 10 may include both an optical camera and a near-infrared ray camera, thus allowing for acquisition of an image of the occupant at any time of day and night.

The information acquisition unit 20 may be provided inside and outside the vehicle. The information acquisition unit 20 may acquire, for example, biometric information of the occupant. Non-limiting examples of the biometric information may include vital data of each occupant.

Non-limiting examples of a sensor provided inside the vehicle may include a sensor mounted on the vehicle, a sensor provided in clothes, and a sensor worn or carried by the occupant like a smartwatch or a smartphone.

Non-limiting examples of a sensor provided outside the vehicle may include a fixed sensor and a movable sensor provided at the occupant's home. Non-limiting examples of the fixed sensor may include a sensor provided on a ceiling or a wall of a bedroom and a sensor embedded in a bed mattress. Non-limiting examples of the movable sensor may include a sensor mounted on a robot or the like.

In addition, the information acquisition unit 20 may include, for example but not limited to, a sensor that acquires vehicle external environment information including, without limitation, weather, an outside temperature, humidity, and date and time. In addition, the information acquisition unit 20 may include, for example but not limited to, an external apparatus that acquires information including, without limitation, traffic congestion information, construction zone information, accident information, and malfunctioning vehicle information.

The information acquisition unit 20 may be configured to acquire the biometric information of the occupant within a predetermined period in the past from the present, in addition to the current biometric information of the occupant.

The first determination processor 30 may determine the physical fatigue level of the occupant inside the vehicle on the basis of information obtained from the imaging unit 10, the information acquisition unit 20, or both.

For example, the first determination processor 30 may quantify a plurality of levels from low to high regarding each piece of information obtained from the imaging unit 10 or the information acquisition unit 20, and thereby determine the physical fatigue level of the occupant inside the vehicle. For example, the plurality of levels may be quantified as levels 1 to 5 as described in FIG. 4. The quantification of the levels may use unique thresholds. The unique thresholds may be values suggested by many academic studies, etc.

The second determination processor 40 may determine the mental fatigue level of the occupant inside the vehicle on the basis of information obtained from the imaging unit 10 or the information acquisition unit 20.

For example, the second determination processor 40 may quantify a plurality of levels from low to high regarding each piece of information obtained from the imaging unit 10, the information acquisition unit 20, or both, and thereby determine the mental fatigue level of the occupant inside the vehicle. For example, the plurality of levels may be quantified as levels 1 to 5 as described in FIG. 4. The quantification of the levels may use unique thresholds. The unique thresholds may be values suggested by many academic studies, etc.

As illustrated in FIG. 3, non-limiting examples of the information to be obtained from the imaging unit 10 may include an opening degree of an eye, the number of times of blinking, sleep duration, rest duration, and the number of times of rolling while sleeping. Non-limiting examples of the information to be obtained from the information acquisition unit 20 may include a heart rate, blood-oxygen saturation, heart rate variability, a respiratory rate, a body temperature, a blood pressure, a hemoglobin level, an activity amount, the number of times of rolling while sleeping, a sleep state, the sleep duration, and vehicle external environment information.

The opening degree of an eye may serve as an example index used for detecting a drowsy state. The number of times of blinking may serve as an example index used for detecting a fatigue degree. The number of times of rolling while sleeping, a REM sleep state, a non-REM sleep state, and the like may serve as example indices used for detecting a sleep state including quality of sleep.

The third determination processor 50 may determine a rest state of the occupant inside the vehicle on the basis of information obtained from the imaging unit 10, the information acquisition unit 20, or both.

For example, the third determination processor 50 may quantify a plurality of levels from low to high regarding each piece of information obtained from the imaging unit 10 or the information acquisition unit 20, and thereby determine the rest state of the occupant inside the vehicle. For example, the plurality of levels may be quantified as levels 1 to 5 as described in FIG. 4. The quantification of the levels may use unique thresholds. The unique thresholds may be values suggested by many academic studies, etc.

As illustrated in FIG. 4, the first determination processor 30, the second determination processor 40, and the third determination processor 50 may each perform a determination process regarding respective biometric information items of the occupant.

For example, the first determination processor 30 may determine the physical fatigue level of the occupant regarding, for example but not limited to, the blood-oxygen saturation, the respiratory rate, the body temperature, the blood pressure, the hemoglobin level, the activity amount, the number of times of blinking, the opening degree of an eye, the sleep duration, the number of times of rolling while sleeping, the sleep state, the rest duration, and the vehicle external environment information.

For example, the second determination processor 40 may determine the mental fatigue level of the occupant regarding, for example but not limited to, the heart rate, the heart rate variability, the respiratory rate, the body temperature, the blood pressure, the hemoglobin level, the number of times of blinking, the opening degree of an eye, the sleep duration, the number of times of rolling while sleeping, the sleep state, the rest duration, and the vehicle external environment information.

For example, the first determination processor 30 may determine the rest state of the occupant regarding, for example but not limited to, the activity amount, the number of times of blinking, the sleep duration, the number of times of rolling while sleeping, the sleep state, and the rest duration. The third determination processor 50 may also determine the rest state on the basis of an image at a resting time of the occupant acquired by the imaging unit 10.

For example, as the information which the third determination processor 50 acquires from the information acquisition unit 20, such as the sleep duration, the quality of sleep, or the activity amount of the occupant, may be the information from the previous day of the traveling day or for several weeks up to the traveling day.

This may allow the third determination processor 50 to integrate the biometric information during the traveling, recent biometric information, and the rest information in the vehicle of the occupant to determine the rest state of the occupant.

Note that, regarding the five evaluation levels used by the first determination processor 30, the second determination processor 40, and the third determination processor 50 illustrated in FIG. 4, the level may be set higher as the numerical value of the item is greater for the heart rate, the blood-oxygen saturation, the heart rate variability, the respiratory rate, the body temperature, the blood pressure, the hemoglobin level, the activity amount, and the number of times of blinking. The level may be set higher as the numerical value of the item is smaller for the opening degree of an eye, the sleep duration, the number of times of rolling while sleeping, the sleep state, and the rest duration. For the vehicle external environment information, the level may be set higher as the situation is worse.

The search control processor 60 may determine a search condition and execute searching of a recommended traveling route and a recommended stop-by point on the basis of at least one of determination information obtained by the first determination processor 30, determination information obtained by the second determination processor 40, or determination information obtained by the third determination processor 50.

Further, the search control processor 60 may supply information of the searched recommended traveling route and the searched recommended stop-by point to the display unit 70, thereby causing a search result to be displayed.

Note that a central processing unit (CPU) including, without limitation, an unillustrated known random-access memory (RAM), an unillustrated known read-only memory (ROM), and an unillustrated known input-output (I/O) bus may serve as the first determination processor 30, the second determination processor 40, the third determination processor 50, and the search control processor 60. The first determination processor 30, the second determination processor 40, the third determination processor 50, and the search control processor 60 may each execute a control in accordance with a control program stored in the ROM.

[Process of Safety Drive Assist Apparatus 1]

Referring to FIGS. 5 to 8, a process to be performed by the safety drive assist apparatus 1 according to the first example embodiment is described.

[Process in Case Where Traveling Route is Set]

Figure 5:
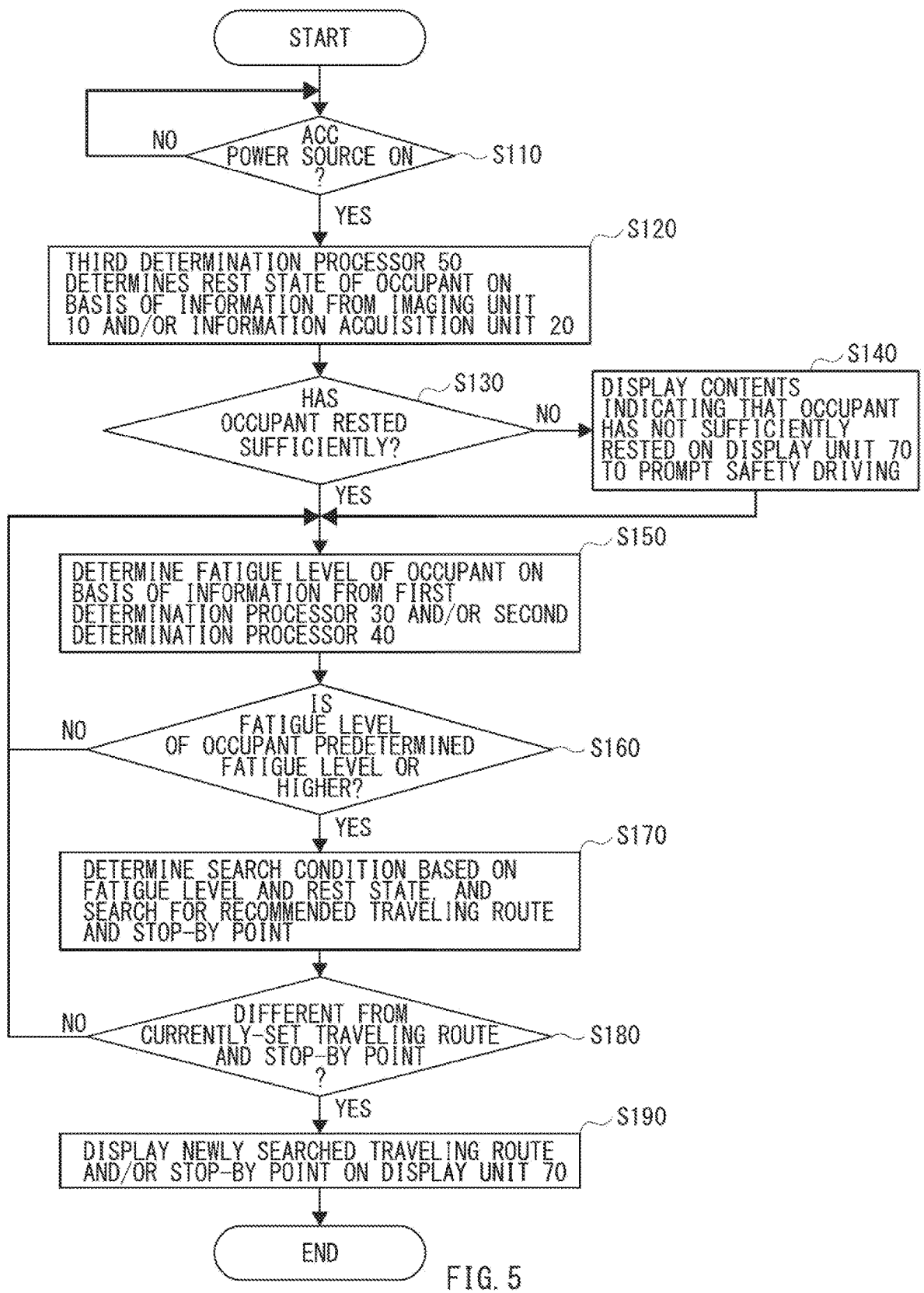
FIG. 5 is a flowchart illustrating an example of a process to be performed by the safety drive assist apparatus according to one example embodiment of the technology.

Referring to FIG. 5, a process to be performed by the safety drive assist apparatus 1 in a case where a traveling route is already set is described.

First, the safety drive assist apparatus 1 may determine whether an accessory power source (ACC power source) of the vehicle is in an ON state (step S110). In a case where the safety drive assist apparatus 1 determines that the ACC power source is not in the ON state (NO in step S110), the safety drive assist apparatus 1 may transition to a standby mode.

In a case where the safety drive assist apparatus 1 determines that the ACC power source of the vehicle is in the ON state (YES in step S110), the safety drive assist apparatus 1 may cause the process to proceed to step S120.

Thereafter, the third determination processor 50 may determine the rest state of the occupant on the basis of information obtained from the imaging unit 10, the information acquisition unit 20, or both, and supply determination information, i.e., information related to the determination process, to the search control processor 60 (step S120).

The search control processor 60, which has acquired information regarding the rest state of the occupant from the third determination processor 50, may determine whether the occupant has sufficiently rested (step S130).

For example, the search control processor 60 may determine that the occupant has not sufficiently rested in a case where the determination information obtained from the third determination processor 50 includes an information acquisition unit output item at a predetermined threshold level or higher based on five-level evaluation. The predetermined threshold level may be, for example, level 4 of the five levels described in FIG. 4.

In a case where the search control processor 60 determines that the occupant has sufficiently rested (YES in step S130), the search control processor 60 may cause the process to move to step S150.

In a case where the search control processor 60 determines that the occupant has not sufficiently rested (NO in step S130), the search control processor 60 may cause the process to move to step S140.

In the case where the search control processor 60 determines that the occupant has not sufficiently rested, the search control processor 60 may display, on the display unit 70, the contents indicating that the occupant has not sufficiently rested (step S140), and may cause the process to move to step S150.

If the search control processor 60 determines that the occupant markedly lacks a rest, the search control processor 60 may change the contents to be displayed in accordance with the information regarding the rest state acquired in step S120. For example, the search control processor 60 may display, on the display unit 70, contents to stop driving.

The search control processor 60 may determine a fatigue level, including the physical fatigue level and the mental fatigue level, of the occupant on the basis of the information obtained from the first determination processor 30, the second determination processor 40, or both (step S150).

Note that the determination of the fatigue level may be integrated determination of the physical fatigue level and the mental fatigue level.

For example, referring to the example illustrated in FIG. 4, if there is an information acquisition unit output item at a predetermined threshold level or higher based on the five-level evaluation, e.g., at level 4 or higher of the five levels described in FIG. 4, the search control processor 60 may determine that the fatigue level is high. In this case, the presence of a single information acquisition unit output item at the predetermined threshold level or higher based on the five-level evaluation, e.g., at level 4 or higher of the five levels described in FIG. 4, may result in the determination of the high fatigue level. Therefore, it can be said that this fatigue level determination method uses a highly strict index.

In one example, the fatigue level may be determined on the basis of the number of the information acquisition unit output items at a predetermined threshold level or higher based on the five-level evaluation, e.g., at level 4 or higher of the five levels described in FIG. 4. In another example, a simple average or a weighted average of all of the information acquisition unit output items may be calculated to determine the fatigue level. For example, the weight for the weighted average may be set on the basis of a degree of influence on the fatigue level based on various findings. In the above-described cases, the fatigue level may be set higher as the calculated value is greater, and variation in the value may be used as an index of an accumulated fatigue degree or a fatigue improvement degree.

Thereafter, the search control processor 60 may determine whether the fatigue level determined in step S150 is a predetermined fatigue level or higher (step S160).

For example, the search control processor 60 may determine that the fatigue level, including the physical fatigue level and the mental fatigue level, of the occupant is the predetermined fatigue level or higher in a case where the determination information obtained from the first determination processor 30 and the second determination processor 40 includes an information acquisition unit output item at a predetermined threshold level or higher based on the five-level evaluation e.g., at level 4 or higher of the five levels described in FIG. 4.

In the example described in FIG. 4, as the determination information obtained from the first determination processor 30, the items of the blood-oxygen saturation, the respiratory rate, and the hemoglobin level are at the predetermined threshold level or higher. As the determination information obtained from the second determination processor 40, the items of the heart rate and the opening degree of an eye are at the predetermined threshold level or higher. Accordingly, the search control processor 60 may determine that the fatigue level of the occupant of the vehicle is at the predetermined fatigue level or higher.

For example, in the case where the number of the information acquisition unit output items at the predetermined threshold level or higher based on the five-level evaluation e.g., at level 4 or higher of the five levels described in FIG. 4, or the simple average or the weighted average of all of the information acquisition unit output items is calculated to determine the fatigue level, for example, a determination level found on the basis of the existing data analysis and academic findings may be used as the predetermined fatigue level (a predetermined level).

In a case where the search control processor 60 determines that the fatigue level of the occupant is lower than the predetermined fatigue level (NO in step S160), the search control processor 60 may cause the process to return to S150.

In a case where the fatigue level determined on the basis of the information obtained from the first determination processor 30, the second determination processor 40, or both is the predetermined fatigue level or higher and the occupant is determined as being experiencing fatigue (YES in step S160), the search control processor 60 may cause the process to move to step S170.

Thereafter, the search control processor 60 may determine the search condition on the basis of: the fatigue level determined on the basis of the information obtained from the first determination processor 30, the second determination processor 40, or both; and the information of the rest state acquired from the third determination processor 50, and execute searching for the recommended traveling route and the recommended stop-by point (step S170).

As illustrated in FIG. 6, in a case where the occupant is determined as being experiencing physical fatigue, for example, in order to reduce the physical fatigue, the search control processor 60 may search for a traveling route satisfying conditions taking into consideration a driving load on a driver to determine the recommended traveling route. The above-described conditions may be regarding, for example but not limited to, a road width, the number of traffic lights, the number of pedestrians, and a traffic amount. For the stop-by point also, in order to reduce the physical fatigue, the search control processor 60 may search for a rest spot close to the current location, taking into consideration the driving load on the driver, to thereby determine the recommended stop-by point.

In a case where the occupant is determined as being experiencing mental fatigue, for example, in order to reduce the mental fatigue, the search control processor 60 may search for a nearby spot with a nice view, taking into consideration the driving load on the driver, to thereby determine the recommended stop-by point.

Thereafter, the search control processor 60 may determine whether the searched recommended traveling route and the searched recommended stop-by point are different from a currently-set traveling route and a currently-set stop-by point (step S180).

In a case where the search control processor 60 determines that the searched recommended traveling route and the searched recommended stop-by point are the same as the currently-set traveling route and the currently-set stop-by point (NO in step S180), the search control processor 60 may cause the process to return to step S150 and continuously monitor the fatigue level of the occupant.

In a case where the search control processor 60 determines that the searched recommended traveling route and the searched recommended stop-by point are different from the currently-set traveling route and the currently-set stop-by point (YES in step S180), the search control processor 60 may display, on the display unit 70, the recommended traveling route, the recommended stop-by point, or both to propose changing the traveling route, the stop-by point, or both to the occupant (step S190). Thereafter, the search control processor 60 may end the process.

In a case where the occupant agrees with the proposed changing of the traveling route, the stop-by point, or both to the recommended traveling route, the recommended stop-by point, or both, the recommended traveling route, the recommended stop-by point, or both which the occupant has agreed with may be set as a new traveling route, a new stop-by point, or both, and guiding may be started.

[Process in Case Where Traveling Route is Not Set]

Figure 7:
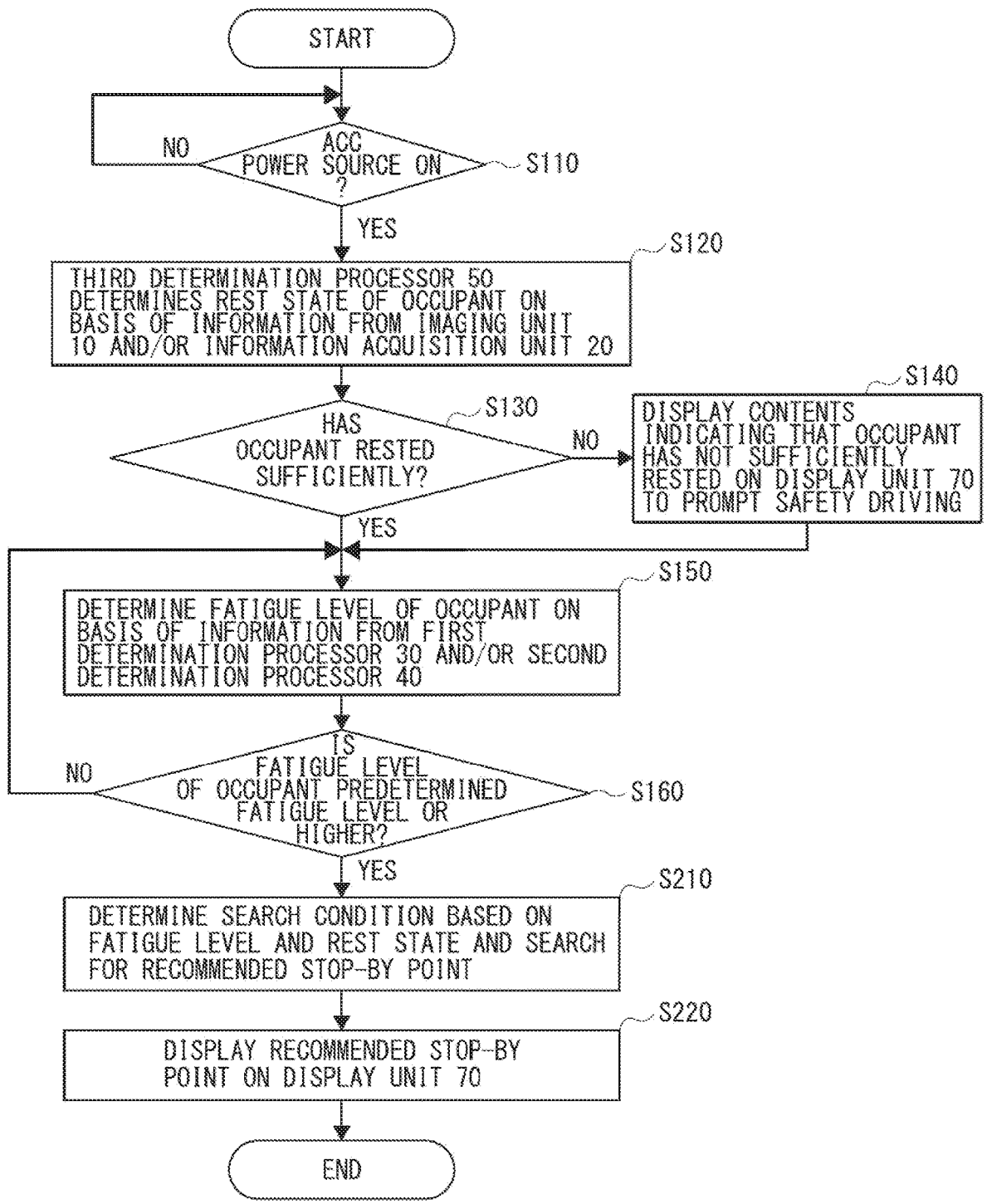
FIG. 7 is a flowchart illustrating an example of a process to be performed by the safety drive assist apparatus according to one example embodiment of the technology.

Referring to FIG. 7, a process to be performed by the safety drive assist apparatus 1 in a case where the traveling route is not set yet is described.

The process to be performed by the safety drive assist apparatus 1 in the case where the traveling route is not set yet is different from the above-described process to be performed in the case where the traveling route is already set by a process at and after step S170. Therefore, the description of the steps S110 to S160 is omitted here and only the changed steps are described below.

As illustrated in FIG. 7, in a case where the search control processor 60 determines that the fatigue level determined on the basis of the information obtained from the first determination processor 30, the second determination processor 40, or both is the predetermined fatigue level or higher and the occupant is experiencing fatigue (YES in step S160), the search control processor 60 may cause the process to move to step S210.

Thereafter, the search control processor 60 may determine the search condition on the basis of: the fatigue level determined on the basis of the information obtained from the first determination processor 30, the second determination processor 40, or both; and the information regarding the rest state acquired from the third determination processor 50, and execute searching for the recommended stop-by point (step S210).

As illustrated in FIG. 6, in a case where the occupant is determined as being experiencing the physical fatigue, for example, in order to reduce the physical fatigue, the search control processor 60 may search for a spot such as a rest spot close to the current location, taking into consideration the driving load on the driver, to thereby determine the recommended stop-by point. In a case where the occupant is determined as being experiencing the mental fatigue, for example, in order to reduce the mental fatigue, the search control processor 60 may search for a spot such as a rest spot close to the current location and with a nice view, taking into consideration the driving load on the driver, to thereby determine the recommended stop-by point.

Depending on the fatigue level and the rest state of the occupant, the search control processor 60 may propose changing the destination itself in order to reduce the fatigue. For example, in a case where a route search is executed for a hot spring as a destination, a process of taking into consideration the fatigue level and the rest state and proposing a hot spring located closer than the designated hot spring in order to reduce the fatigue may be added.

Thereafter, the search control processor 60 may display, on the display unit 70, the recommended stop-by point searched in step S210, and thereby propose the recommended stop-by point to the occupant (step S220). In one example, on the foregoing occasion, the search control processor 60 may also display that fatigue is detected to rise attention for driving, while displaying the recommended stop-by point for the occupant.

In a case where the occupant agrees to stop by the proposed recommended stop-by point, the search control processor 60 may search for a traveling route to the recommended stop-by point and start route guidance.

[Process to Set Traveling Route]

Figure 8:
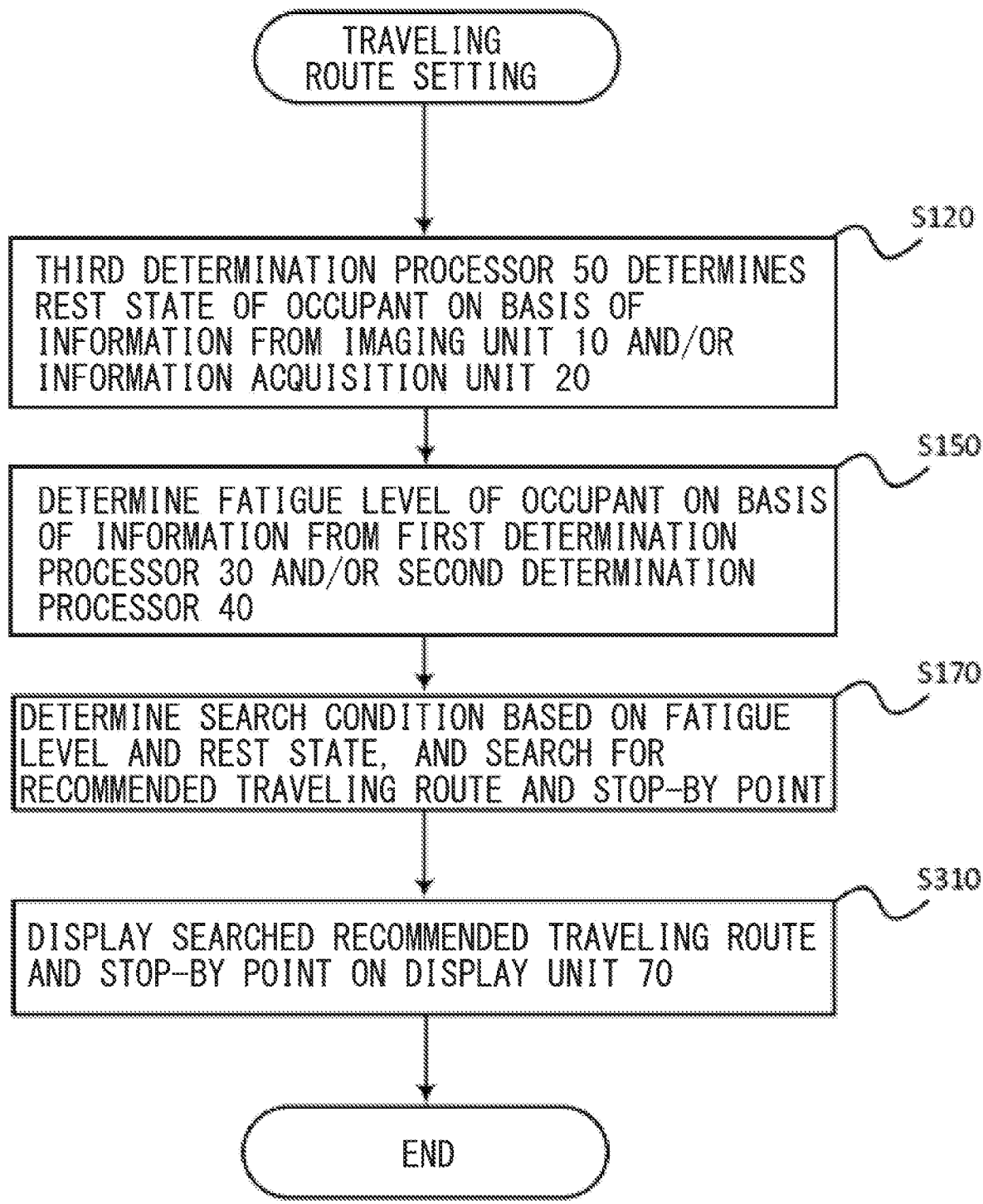
FIG. 8 is a flowchart illustrating an example of a process to set the traveling route of the safety drive assist apparatus according to one example embodiment of the technology.

Referring to FIG. 8, a process to be performed by the safety drive assist apparatus 1 in a case where the occupant sets the destination to set the traveling route is described.

First, the third determination processor 50 may determine the rest state of the occupant on the basis of the information obtained from the imaging unit 10, the information acquisition unit 20, or both, and supply information of the determined rest state to the search control processor 60 (step S120).

Thereafter, the search control processor 60 may determine the fatigue level of the occupant on the basis of the information obtained from the first determination processor 30, the second determination processor 40, or both (step S150).

Thereafter, the search control processor 60 may determine the search condition on the basis of: the fatigue level determined on the basis of the information obtained from the first determination processor 30, the second determination processor 40, or both; and the information of the rest state acquired from the third determination processor 50, and execute searching for the recommended traveling route and the recommended stop-by point (step S170).

Thereafter, the search control processor 60 may display, on the display unit 70, the recommended traveling route and the recommended stop-by point to propose the traveling route and the stop-by point to the occupant (step S310).

Here, in one example, the search control processor 60 may propose changing the destination itself on the basis of: the fatigue level determined on the basis of the information obtained from the first determination processor 30, the second determination processor 40, or both; and the information of the rest state acquired from the third determination processor 50.

For example, in a case where the destination is a hot spring, the search control processor 60 may perform a process of proposing, to the occupant, another hot spring that is closer than the designated hot spring and can be reached by a stressless route such as a route with no traffic congestion.

In a case where the occupant agrees with the proposed recommended traveling route and the proposed recommended stop-by point, the search control processor 60 may start the guidance.

[Example Workings and Example Effects]

As described above, the safety drive assist apparatus 1 according to the first example embodiment includes the imaging unit 10 and the information acquisition unit 20. The imaging unit 10 may be provided inside the vehicle and capture an image of the occupant. The information acquisition unit 20 may be provided inside and outside the vehicle and be configured to acquire the biometric information of the occupant. The safety drive assist apparatus 1 may further include the first determination processor 30 and the second determination processor 40. The first determination processor 30 and the second determination processor 40 may determine the physical fatigue level and the mental fatigue level, respectively, on the basis of the information of the occupant acquired by the imaging unit 10 and the information acquisition unit 20. The search control processor 60 may search for the recommended traveling route and the recommended stop-by point on the basis of the search condition based on the determination information obtained by the first determination processor 30, the determination information obtained by the second determination processor 40, or both, and propose a result of the search to the occupant.

That is, the safety drive assist apparatus 1 that determines the fatigue level of the occupant on the basis of the physical fatigue level and the mental fatigue level of the occupant may propose, to the occupant, the recommended traveling route and the recommended stop-by point based on the degree of fatigue.

Accordingly, in a case where the physical and the mental fatigue levels of the occupant are high, for example, a traveling route with less driving load or a nearby rest spot may be proposed in order to reduce the fatigue of the occupant. Non-limiting examples of the traveling route with less driving load may include a route with less traffic congestion and a route with less curves that lead to the destination or the stop-by point. As a result, it is possible to reduce a possibility of accident occurrence due to fatigue.

Moreover, according to the first example embodiment, the third determination processor 50 may be provided in addition. The third determination processor 50 may determine the rest state of the occupant on the basis of the information obtained from the imaging unit 10, the information acquisition unit 20, or both. The search control processor 60 may search for the recommended traveling route and the recommended stop-by point on the basis of the search condition based on at least one of the determination information obtained by the first determination processor 30, the determination information obtained by the second determination processor 40, or the determination information obtained by the third determination processor 50, and propose a result of the search to the occupant.

That is, the state of the rest recently taken by the occupant may be also determined in addition to the current fatigue level of the occupant, and the recommended traveling route and the recommended stop-by point based on the fatigue level of the occupant and the degree of the rest state of the occupant may be proposed to the occupant.

Accordingly, in a case where the occupant has not slept well and has not sufficiently rested, for example, a traveling route with less driving load or a nearby rest spot may be proposed to the occupant. This makes it possible to reduce the possibility of accident occurrence due to fatigue.

Moreover, according to the first example embodiment, in a case where: the recommended traveling route is set; the fatigue level of the occupant is the predetermined level or higher; and the third determination processor 50 determines that the occupant has not taken the predetermined rest or more, the search control processor 60 may use the search condition for decreasing the fatigue level to search for the recommended traveling route and the recommended stop-by point, and propose changing the recommended traveling route, the recommended stop-by point, or both to the occupant. The fatigue level may be determined by the search control processor 60 on the basis of the determination information obtained by the first determination processor 30, the determination information obtained by the second determination processor 40, or both.

That is, in a case where the fatigue level of the occupant is determined as being the predetermined fatigue level or higher and the occupant is determined as not having sufficiently rested, changing of the traveling route, the stop-by point, or both to a new traveling route, a new stop-by point, or both that decrease the fatigue level of the occupant may be proposed to the occupant.

Accordingly, in the case where the fatigue level of the occupant is determined as being the predetermined fatigue level or higher and the occupant is determined as not having sufficiently rested, for example, a traveling route with less driving load or a nearby rest spot for decreasing the fatigue level of the occupant may be proposed. This makes it possible to reduce the possibility of accident occurrence due to fatigue.

Moreover, in a case where the occupant has not sufficiently rested at a driving start timing, the occupant may be informed that he or she has not sufficiently rested and should be careful when driving. This makes it possible to reduce the possibility of accident occurrence due to fatigue.

Moreover, according to the first example embodiment, in a case where: the recommended traveling route is not set; the fatigue level of the occupant is the predetermined level or higher; and the third determination processor 50 determines that the occupant has not taken a predetermined rest or more, the search control processor 60 may use the search condition for decreasing the fatigue level to search for the recommended stop-by point, and propose the recommended stop-by point to the occupant. The fatigue level may be determined by the search control processor 60 on the basis of the determination information obtained by the first determination processor 30, the determination information obtained by the second determination processor 40, or both.

That is, in a case where the fatigue level of the occupant is determined as being the predetermined fatigue level or higher and the occupant is determined as not having sufficiently rested, a stop-by point for decreasing the fatigue level of the occupant may be proposed to the occupant.

Accordingly, even in a case where the traveling route is not set yet, if the fatigue level of the occupant is determined as being the predetermined fatigue level or higher and the occupant is determined as not having sufficiently rested, a stop-by point for helping to improve the fatigue level may be proposed to the occupant. This makes it possible to reduce the possibility of accident occurrence due to fatigue.

Moreover, according to the first example embodiment, the third determination processor 50 may determine the rest state on the basis of the information, including the sleep duration, the quality of sleep, and the activity amount of the occupant, acquired by the information acquisition unit 20.

That is, the fatigue level may be determined not only on the basis of the current biometric information of the occupant. Further acquiring the information such as the recent sleep duration, the recent quality of sleep, the recent activity amount, and the like of the occupant helps to more accurately determine the fatigue level of the occupant.

Accordingly, it is possible to propose the recommended traveling route and the recommended stop-by point on the basis of more accurate information regarding the occupant fatigue determination. This makes it possible to reduce the possibility of accident occurrence due to fatigue.

Moreover, according to the first example embodiment, the third determination processor 50 may determine the rest state on the basis of the image at the resting time of the occupant acquired by the imaging unit 10.

That is, an image of the state of the resting or sleeping occupant may be acquired by a device such as a camera, and whether the occupant has sufficiently rested may be determined on the basis of the acquired image. This makes it possible to more precisely determine the rest state of the occupant.

Accordingly, it is possible to propose the recommended traveling route and the recommended stop-by point on the basis of more accurate information of the rest state of the occupant. This makes it possible to reduce the possibility of accident occurrence due to fatigue.

Second Example Embodiment

Referring to FIGS. 9 to 12, a safety drive assist apparatus 1A according to a second example embodiment of the technology is described.

[Configuration of Safety Drive Assist Apparatus 1A]

Figure 9:
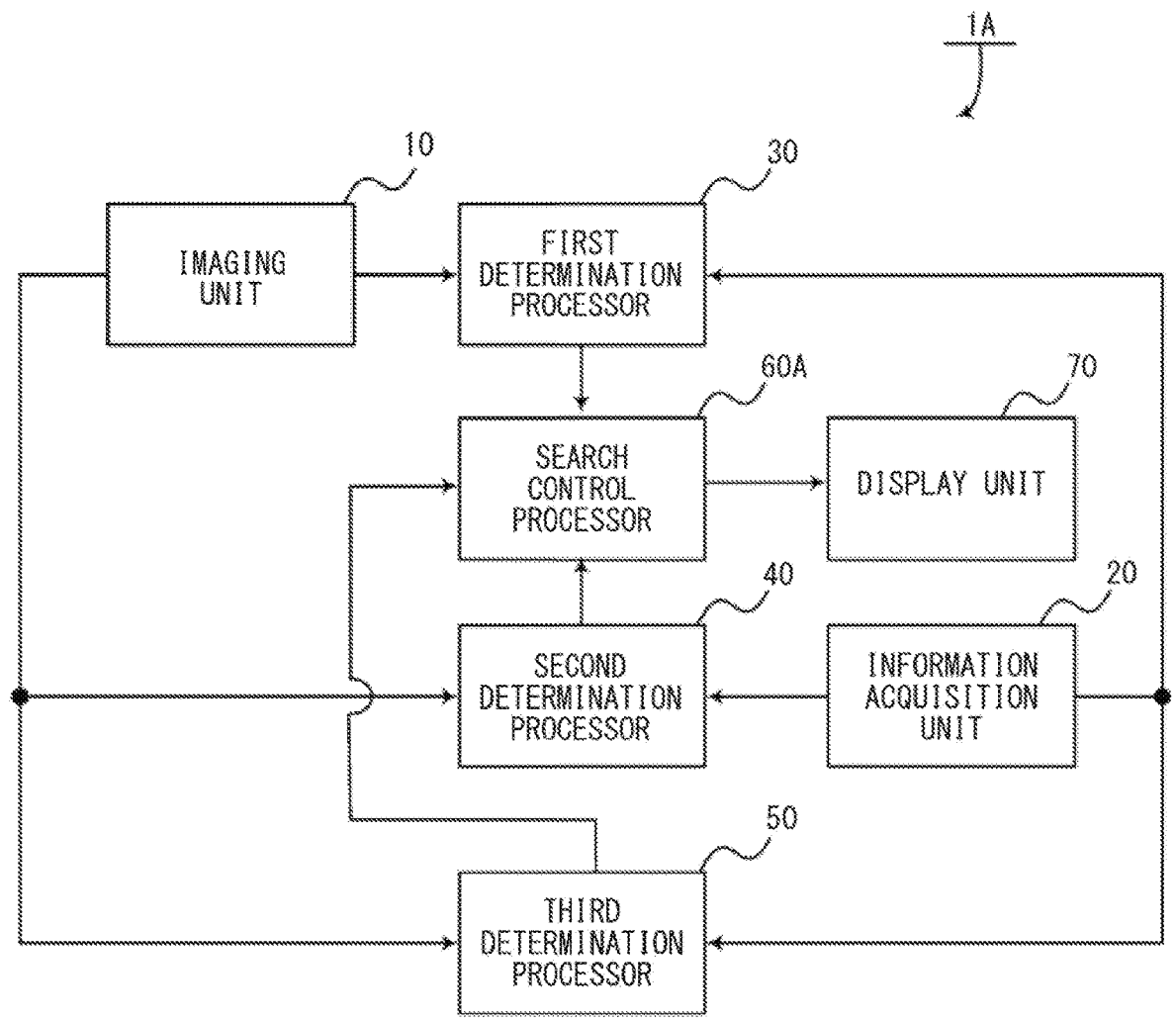
FIG. 9 is a diagram illustrating an example of a configuration of a safety drive assist apparatus according to one example embodiment of the technology.

As illustrated in FIG. 9, the safety drive assist apparatus 1A according to the second example embodiment may include the imaging unit 10, the information acquisition unit 20, the first determination processor 30, the second determination processor 40, the third determination processor 50, a search control processor 60A, and the display unit 70.

Note that the components denoted with the same referential signs as those in the first example embodiment may serve as the same, and are therefore not described further in detail here.

The search control processor 60A may select, by machine learning, the recommended traveling route and the recommended stop-by point for decreasing the fatigue level of the occupant. Details thereof will be described later.

[Configuration of Search Control Processor 60A]

Figure 10:
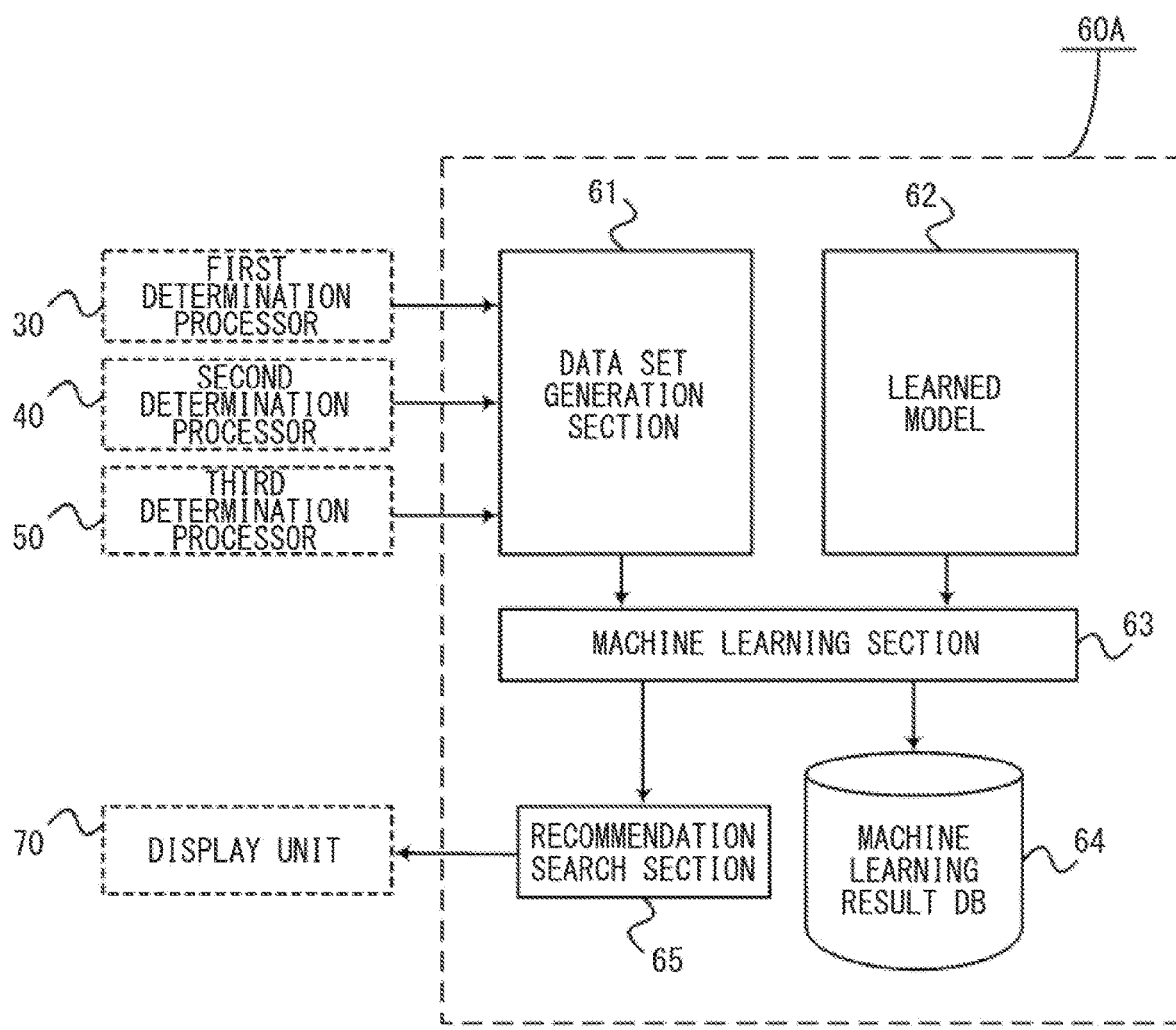
FIG. 10 is a diagram illustrating an example of a configuration of a search control processor of the safety drive assist apparatus according to one example embodiment of the technology.

As illustrated in FIG. 10, the search control processor 60A may include a data set generation section 61, a learned model 62, a machine learning section 63, a machine learning result database (DB) 64, and a recommendation search section 65.

The data set generation section 61 may generate a data set to be used by the machine learning section 63, on the basis of the determination information supplied from the first determination processor 30, the second determination processor 40, and the third determination processor 50.

The learned model 62 may be generated by inputting pre-existing particular learning data to a neural network (NN) and performing deep learning.

Note that, in one example, the learned model 62 may be generated on the basis of actual data stored in the later-described machine learning result database (DB) 64.

The machine learning section 63 may include the neural network (NN). The machine learning section 63 may use the data set generated by the data set generation section 61 as input data, and execute deep learning with use of the learned model 62. The machine learning section 63 may thereby output information regarding a search condition for the recommended traveling route and the recommended stop-by point.

For example, the machine learning section 63 may calculate a deviation of a score with respect to similarity between the data set generated by the data set generation section 61 and the learned model 62. In a case where the calculated deviation is a predetermined value or less, the machine learning section 63 may detect the search condition included in the learned model 62. Further, the machine learning section 63 may supply information of the detected search condition to the recommendation search section 65, and store the information in the machine learning result database (DB) 64.

In one example, data such as an ID or personal information unique to the occupant may be associated with the data set generated by the data set generation section 61, and the data set and the associated ID or personal information may be used as the input to the machine learning section 63.

In one example, vehicle external environment information acquired from an external apparatus or the like including, without limitation, a season, a weather, a temperature, humidity, a construction zone, accident information, and malfunctioning vehicle information may be included in the input to the machine learning section 63.

In one example, the learned model 62 may be generated by using, as learning data, data in which a data set generated by the data set generation section 61 after elapse of a predetermined time period and information such as the ID or the personal information unique to the occupant are associated with the data stored in the machine learning result database (DB) 64. The learned model 62 may be thus updated appropriately.

The machine learning result database (DB) 64 may receive via the machine learning section 63 and hold therein a data set in which the data set generated by the data set generation section 61 and search condition information supplied from the machine learning section 63 are combined.

The recommendation search section 65 may search for the recommended traveling route and the recommended stop-by point on the basis of the search condition information supplied from the machine learning section 63.

[Process of Safety Drive Assist Apparatus 1A]

Figure 11:
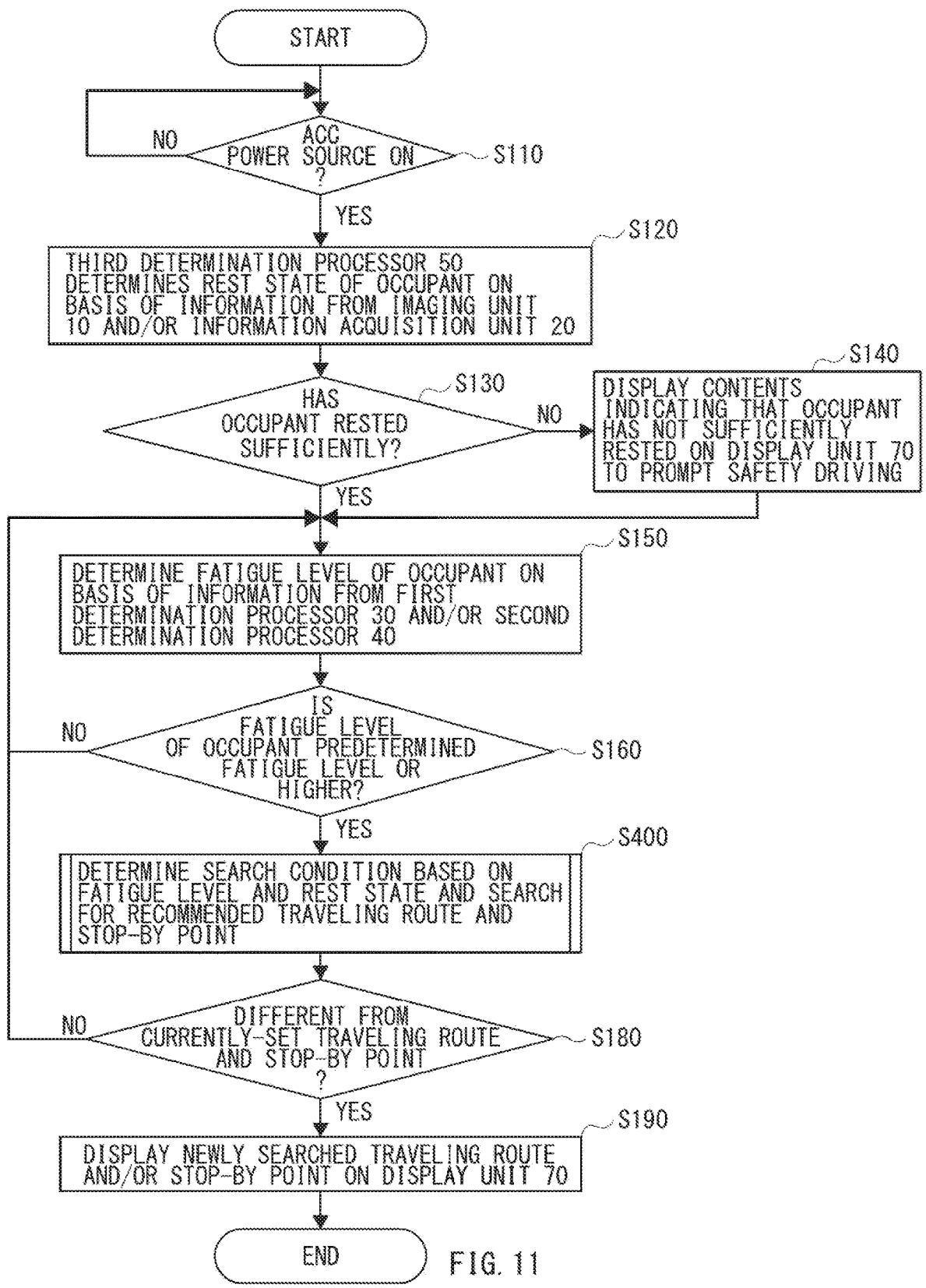
FIG. 11 is a flowchart illustrating an example of a process to be performed by the safety drive assist apparatus according to one example embodiment of the technology.
Figure 12:
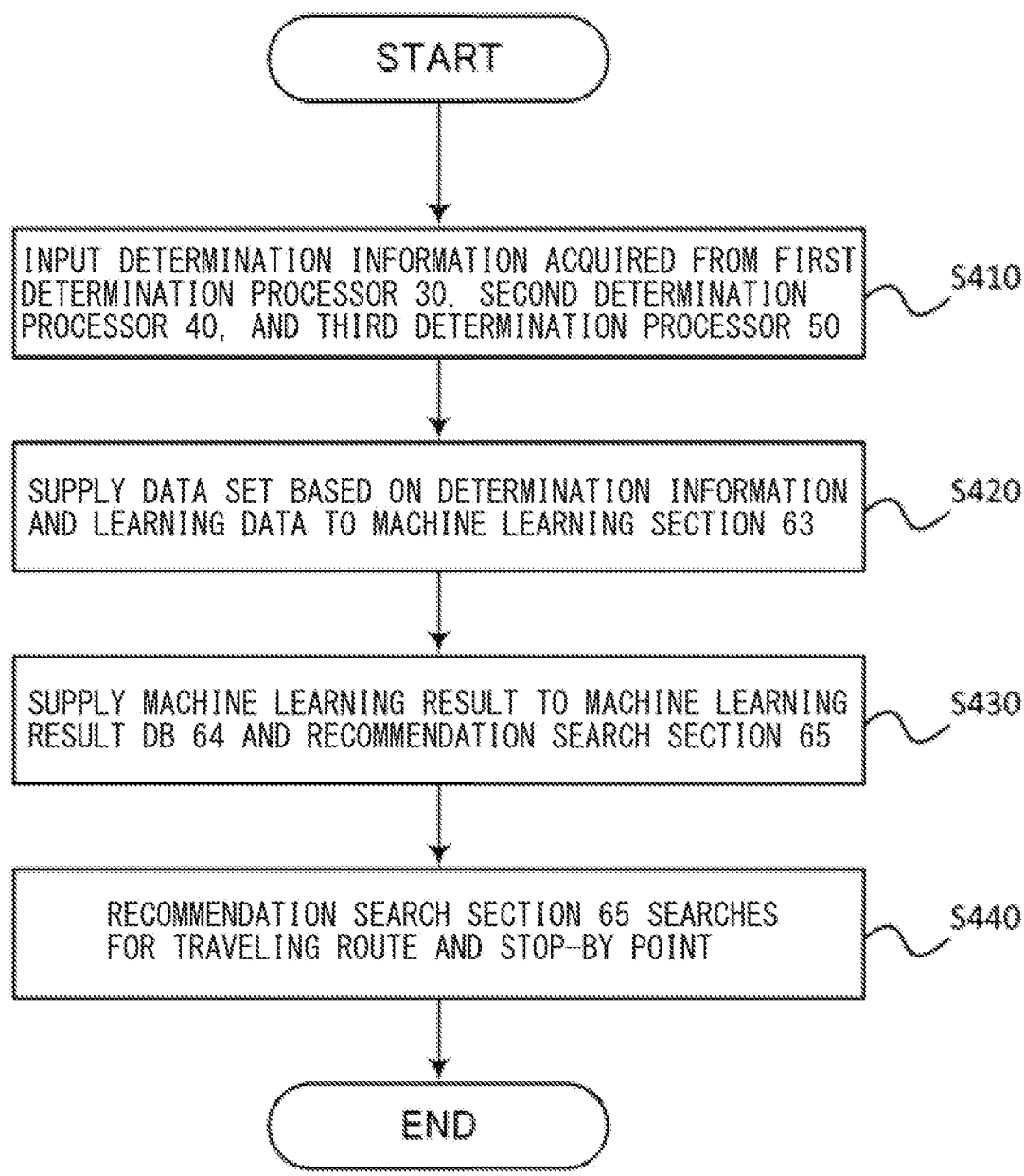
FIG. 12 is a flowchart illustrating an example of a process of searching for a recommended traveling route and a recommended stop-by point to be performed by a search control processor 60A of the safety drive assist apparatus according to one example embodiment of the technology.

Referring to FIGS. 11 and 12, a process to be performed by the safety drive assist apparatus 1A according to the second example embodiment is described.

As illustrated in FIG. 11, the process to be performed by the safety drive assist apparatus 1A according to the second example embodiment may differ from the process to be performed by the safety drive assist apparatus 1 according to the first example embodiment only by a process in step S400. Therefore, only the process in step S400 is described in detail below.

[Recommended Traveling Route and Recommended Stop-By Point Search Process of Search Control Processor 60A]

As illustrated in FIG. 12, the search control processor 60A may supply, to the data set generation section 61, the determination information acquired from the first determination processor 30, the second determination processor 40, and the third determination processor 50 (step S410).

The data set generation section 61 may generate a data set on the basis of the supplied determination information, and supply the generated data set to the machine learning section 63 (step S420). In step 420, in addition, the machine learning section 63 may also take in the learned model 62.

The machine learning section 63 may use the data set generated by the data set generation section 61 as the input data, and execute machine learning with use of the learned model 62. The machine learning section 63 may thereby supply, to the recommendation search section 65, the information of the search condition for the traveling route and the stop-by point as a learning result (step S430). In step S430, in addition, the machine learning section 63 may store, as the learning result, the information of the search condition for the traveling route and the stop-by point in the machine learning result database (DB) 64.

The recommendation search section 65 may execute searching on the basis of the supplied information of the search condition for the traveling route and the stop-by point (step S440).

[Example Workings and Example Effects]

As described above, the search control processor 60A of the safety drive assist apparatus 1A according to the second example embodiment may determine, by machine learning, the search condition for the traveling route and the stop-by point, and propose the traveling route and the stop-by point for decreasing the fatigue level of the occupant.

Therefore, this allows the search control processor 60A to execute the machine learning on the basis of at least one of the determination information obtained by the first determination processor 30, the determination information obtained by the second determination processor 40, or the determination information obtained by the third determination processor 50, and thereby propose the recommended traveling route and the recommended stop-by point for decreasing the fatigue level of the occupant inside the vehicle. As a result, it is possible to reduce the possibility of accident occurrence due to fatigue.

Moreover, associating the information such as the ID or the personal information unique to the occupant with the data set generated by the data set generation section 61 and using the associated information and the data set as input information for the machine learning section 63 may allow for setting of the search condition based on the occupant. Accordingly, it is possible to propose an appropriate traveling route and an appropriate stop-by point. As a result, it is possible to reduce the possibility of accident occurrence due to fatigue.

Moreover, including the environment information including, without limitation, the season, the weather, the temperature, the humidity, the construction zone, the accident information, and the malfunctioning vehicle information in the above-described input information allows for setting of a more appropriate search condition based on the occupant. This makes it possible to propose a more appropriate traveling route and a more appropriate stop-by point. As a result, it is possible to reduce the possibility of accident occurrence due to fatigue.

Moreover, using, as the learning data, the data in which the data set generated by the data set generation section 61 after elapse of the predetermined time period and the information such as the ID or the personal information unique to the occupant are associated with the data stored in the machine learning result database (DB) 64 and thereby appropriately updating the learned model 62 make it possible to more effectively select the search condition. As a result, it is possible to reduce the possibility of accident occurrence due to fatigue.

Other Example Embodiments

For example, provided may be a configuration in which the information obtained by the imaging unit 10 and the information obtained by the information acquisition unit 20 are transferred to a server coupled to the vehicle, and the processes performed by the first determination processor 30, the second determination processor 40, the third determination processor 50, and the search control processor 60 may be executed in the server.

With such a configuration, it is possible to perform a process taking more information into consideration, for example, upon the determination of fatigue or the search condition. Accordingly, it is possible to propose a traveling route and a stop-by point for further decreasing the fatigue level of the occupant. As a result, it is possible to reduce the possibility of accident occurrence due to fatigue.

In a usual example, taking a rest may be proposed after two-hour driving in accordance with: the fatigue level determined on the basis of the determination information obtained by the first determination processor 30, the second determination processor 40, or both; and the rest state determined by the third determination processor 50. However, a timing of such proposing may be changed. For example, taking a rest may be proposed after one-hour driving.

That is, in a case where the occupant is experiencing fatigue, taking a rest may be proposed at a shorter time interval. As a result, it is possible to reduce the possibility of accident occurrence due to fatigue.

Moreover, although the information acquired by the information acquisition unit 20 is listed as an example in FIG. 3, this is non-limiting. For example, information including, without limitation, brain waves, an amount of sweat, a temperature of skin, and a blood glucose level may be acquired, and any combination of the various pieces of biometric information may be used to determine fatigue.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

In one or more of the example embodiments of the technology, the third determination processor may determine the rest state on the basis of the information including the sleep duration, the quality of sleep, and the activity amount of the occupant acquired by the information acquisition unit.

In one or more of the example embodiments of the technology, the third determination processor may determine the rest state on the basis of the image at the resting time of the occupant acquired by the imaging unit.

Each of the information acquisition unit 20, the first determination processor 30, the second determination processor 40, the third determination processor 50, the search control processors 60 and 60A, the data set generation section 61, the machine learning section 63, and the recommendation search section 65 illustrated in any of FIGS. 2, 9 and 10 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the information acquisition unit 20, the first determination processor 30, the second determination processor 40, the third determination processor 50, the search control processors 60 and 60A, the data set generation section 61, the machine learning section 63, and the recommendation search section 65 illustrated in any of FIGS. 2, 9 and 10. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the information acquisition unit 20, the first determination processor 30, the second determination processor 40, the third determination processor 50, the search control processors 60 and 60A, the data set generation section 61, the machine learning section 63, and the recommendation search section 65 illustrated in any of FIGS. 2, 9 and 10.

The invention claimed is:

1. A safety drive assist apparatus to be applied to a vehicle, the safety drive assist apparatus comprising:
an imaging unit configured to capture an image of an occupant inside the vehicle;
an information acquisition unit configured to acquire information including biometric information of the occupant inside and outside the vehicle;
a determination processor configured to acquire occupant information based on at least one of the image of the occupant inside the vehicle captured by the imaging unit and the information including the biometric information of the occupant inside and outside the vehicle acquired by the information acquisition unit,
wherein the occupant information includes:
physical fatigue determination information including information of blood-oxygen saturation, information of respiratory rate, information of body temperature, information of blood pressure, information of hemoglobin level, information of activity amount, information of number of times of blinking, information of opening degree of an eye, information of sleep duration, information of number of times of rolling while sleeping, information of sleep state, or information of rest duration, the physical fatigue determination information not including information of heart rate and information of heart rate variability; and
mental fatigue determination information including the information of heart rate or the information of heart rate variability,
wherein the determination processor includes:
a first determination processor configured to quantify the physical fatigue determination information out of the occupant information into one or more first levels that indicate one or more numerical values in a predetermined range, and execute a first determination that the occupant is physically fatigued based on the one or more first levels; and
a second determination processor configured to quantify the mental fatigue determination information out of the occupant information into one or more second levels that indicate one or more numerical values in the predetermined range, and execute a second determination that the occupant is mentally fatigued based on the one or more second levels; and
a search control processor configured to search for a recommended traveling route and a recommended stop-by point based on a search condition, and propose one or both of the recommended traveling route and the recommended stop-by point to the occupant, the search control processor being configured to determine the search condition based on one or both of the first determination and the second determination,
wherein the search condition includes a first search condition when the first determination out of the first determination and the second determination is executed, and a second search condition when the second determination out of the first determination and the second determination is executed, and
wherein the first search condition and the second search condition are different from each other.

2. The safety drive assist apparatus according to claim 1, wherein
the determination processor further includes a third determination processor configured to determine a rest state of the occupant inside the vehicle based on the occupant information,
the search control processor is configured to determine the search condition based on the rest state, and propose one or both of the recommended traveling route and the recommended stop-by point to the occupant.

3. The safety drive assist apparatus according to claim 1, wherein
the first determination processor is further configured to execute a first comparison of one of the one or more first levels with a first threshold, and execute the first determination that the occupant is physically fatigued based on a result of the first comparison, and
the second determination processor is further configured to execute a second comparison of one of the one or more second levels with a second threshold, and execute the second determination that the occupant is mentally fatigued based on a result of the second comparison.

4. The safety drive assist apparatus according to claim 1, wherein
the one or more first levels include first levels representing first items including the information of blood-oxygen saturation, the information of respiratory rate, the information of body temperature, the information of blood pressure, the information of hemoglobin level, the information of activity amount, the information of number of times of blinking, the information of opening degree of the eye, the information of sleep duration, the information of number of times of rolling while sleeping, the information of sleep state, and the information of rest duration, the one or more second levels include second levels representing second items including the information of heart rate and the information of heart rate variability, the first determination processor is further configured to execute a first comparison of an average value of the first levels with a first threshold, and execute the first determination that the occupant is physically fatigued based on a result of the first comparison, and the second determination processor is further configured to execute a second comparison of an average value of the second levels with a second threshold, and execute the second determination that the occupant is mentally fatigued based on a result of the second comparison.

5. The safety drive assist apparatus according to claim 1, wherein the first search condition includes: a first route search condition regarding a road width, a number of traffic lights, a number of pedestrians, and a traffic amount; and a first stop-by point search condition for searching a rest spot close to a current location of the vehicle as the stop-by point, and the second search condition includes: a second route search condition for searching a road with a nice view; and a second stop-by point search condition for searching a rest spot with a nice view as the stop-by point.

6. A safety drive assist apparatus comprising to be applied to a vehicle, the safety drive assist apparatus comprising:

an imaging unit including a first sensor, the imaging unit being configured to capture an image of an occupant inside a vehicle;

an information acquisition unit including a second sensor, the information acquisition unit is configured to acquire information including biometric information of the occupant inside and outside the vehicle; and circuitry configured to acquire occupant information based on at least one of the image of the occupant inside the vehicle captured by the imaging unit and the acquired information including the biometric information of the occupant inside and outside the vehicle, wherein the occupant information includes physical fatigue determination information including information of blood-oxygen saturation, information of respiratory rate, information of body temperature, information of blood pressure, information of hemoglobin level, information of activity amount, information of number of times of blinking, information of opening degree of an eye, information of sleep duration, information of number of times of rolling while sleeping, information of sleep state, or information of rest duration, the physical fatigue determination information not including information of heart rate and information of heart rate variability, and mental fatigue determination information including the information of heart rate or the information of heart rate variability, wherein the circuitry is further configured to quantify the physical fatigue determination information out of the occupant information into one or more first levels that indicate one or more numerical values in a predetermined range, and execute a first determination that the occupant is physically fatigued based on the one or more first levels, and quantify the mental fatigue determination information out of the occupant information into one or more second levels that indicate one or more numerical values in the predetermined range, and execute a second determination that the occupant is mentally fatigued based on the one or more second levels, and search for a recommended traveling route and a recommended stop-by point based on a search condition, and propose one or both of the recommended traveling route, and the recommended stop-by point to the occupant, the search condition being determined based on one or both of the first determination and the second determination, wherein the search condition includes a first search condition when the first determination out of the first determination and the second determination is executed, and a second search condition when the second determination out of the first determination and the second determination is executed, and wherein the first search condition and the second search condition are different from each other.

7. The safety drive assist apparatus according to claim 6, wherein the circuitry is further configured to:

execute a first comparison of one of the one or more first levels with a first threshold; and execute the first determination that the occupant is physically fatigued based on a result of the first comparison, and execute a second comparison of one of the one or more second levels with a second threshold, and execute the second determination that the occupant is mentally fatigued based on a result of the second comparison.

8. The safety drive assist apparatus according to claim 6, wherein the one or more first levels include first levels representing first items including the information of blood-oxygen saturation, the information of respiratory rate, the information of body temperature, the information of blood pressure, the information of hemoglobin level, the information of activity amount, the information of number of times of blinking, the information of opening degree of the eye, the information of sleep duration, the information of number of times of rolling while sleeping, the information of sleep state, and the information of rest duration, the one or more second levels include second levels representing second items including the information of heart rate and the information of heart rate variability, and the circuitry is further configured to:

execute a first comparison of an average value of the first levels with a first threshold, and execute the first determination that the occupant is physically fatigued based on a result of the first comparison; and execute a second comparison of an average value of the second levels with a second threshold, and execute the second determination that the occupant is mentally fatigued based on a result of the second comparison.

9. The safety drive assist apparatus according to claim 6, wherein
the first search condition includes:
- a first route search condition regarding a road width, a number of traffic lights, a number of pedestrians, and a traffic amount; and
- a first stop-by point search condition for searching a rest spot close to a current location of the vehicle as the stop-by point, and the second search condition includes: a second route search condition for searching a road with a nice view; and a second stop-by point search condition for searching a rest spot with a nice view as the stop-by point.

* * * * *